(12) United States Patent
Turker et al.

(10) Patent No.: US 12,531,191 B2
(45) Date of Patent: Jan. 20, 2026

(54) GEL ELECTROLYTE FOR USE IN AN ENERGY STORAGE DEVICE AND SUPERCAPACITOR CELL

(71) Applicants: SABANCI UNIVERSITESI NANOTEKNOLOJI ARASTIRMA VE UYGULAMA MERKEZI, Istanbul (TR); ISTANBUL TEKNIK UNIVERSITESI, Istanbul (TR)

(72) Inventors: Yurdanur Turker, Izmir (TR); Koray Bahadir Donmez, Istanbul (TR); Mert Umut Ozkaynak, Istanbul (TR); Fatma Seniha Guner, Istanbul (TR); Nilgun Karatepe Yavuz, Istanbul (TR)

(73) Assignees: SABANCI UNIVERSITESI NANOTEKNOLOJI ARASTIRMA VE UYGULAMA MERKEZI, Istanbul (TR); ISTANBUL TEKNIK UNIVERSITESI, Istanbul (TR)

( * ) Notice: Subject to any disclaimer, the term of this patent is extended or adjusted under 35 U.S.C. 154(b) by 130 days.

(21) Appl. No.: 18/703,410

(22) PCT Filed: Oct. 10, 2022

(86) PCT No.: PCT/TR2022/051106
§ 371 (c)(1),
(2) Date: Apr. 22, 2024

(87) PCT Pub. No.: WO2023/069051
PCT Pub. Date: Apr. 27, 2023

(65) Prior Publication Data
US 2025/0239418 A1    Jul. 24, 2025

(30) Foreign Application Priority Data
Oct. 21, 2021   (TR) .............................. 2021/016436

(51) Int. Cl.
*H01G 11/56*   (2013.01)

(52) U.S. Cl.
CPC ................................. *H01G 11/56* (2013.01)

(58) Field of Classification Search
CPC ........ H01G 11/56; H01G 11/84; Y02E 60/13; H01M 10/056
See application file for complete search history.

(56) References Cited

U.S. PATENT DOCUMENTS

| | | | |
|---|---|---|---|
| 2002/0009635 A1 | 1/2002 | Michot et al. | |
| 2010/0304221 A1* | 12/2010 | Zhang | H01M 50/46 429/300 |
| 2025/0239418 A1* | 7/2025 | Turker | H01G 11/56 |

FOREIGN PATENT DOCUMENTS

| | | | |
|---|---|---|---|
| CN | 105218864 A | * | 1/2016 |
| CN | 114320133 B | * | 9/2023 |

(Continued)

OTHER PUBLICATIONS

Ebrima Tunkara, et al., Highly Proton Conductive Phosphoric Acid-Nonionic Surfactant Lyotropic Liquid Crystalline Mesophases and Application in Graphene Optical Modulators, ACS NANO, 2014, pp. 11007-11012, vol. 8 No. 10.

*Primary Examiner* — Dion R. Ferguson
(74) *Attorney, Agent, or Firm* — Bayramoglu Law Offices LLC

(57) ABSTRACT

A gel electrolyte is configured for use in an energy storage device, and the electrolyte includes phosphoric acid and nonionic surfactant. The molar ratio of phosphoric acid (PA) to nonionic surfactant is 50 to 120.

8 Claims, 2 Drawing Sheets

(56) References Cited

FOREIGN PATENT DOCUMENTS

| EP | 1293997 A2 | 3/2003 | |
|---|---|---|---|
| JP | WO2002093679 A1 * | 9/2004 | ............. H01G 11/60 |
| JP | 2006236837 A * | 9/2006 | ............. H01G 11/56 |
| JP | 4304384 B2 * | 7/2009 | ............. H01G 11/56 |
| JP | 2012116770 A | 6/2012 | |
| JP | 2021162853 A | 10/2021 | |

\* cited by examiner

GEL ELECTROLYTE FOR USE IN AN ENERGY STORAGE DEVICE AND SUPERCAPACITOR CELL

CROSS REFERENCE TO THE RELATED APPLICATIONS

This application is the national phase entry of International Application No. PCT/TR2022/051106, filed on Oct. 10, 2022, which is based upon and claims priority to Turkish Patent Application No. 2021/016436, filed on Oct. 21, 2021, the entire contents of which are incorporated herein by reference.

TECHNICAL FIELD

The invention relates to gel electrolytes for use in energy storage devices. In particular, the invention relates to production of an electrolyte with optimized conductivity for preparation of high energy storage supercapacitors.

BACKGROUND

Supercapacitors, alternatively known as ultracapacitors, electrical double layer capacitors or electrochemical capacitors, are energy storage devices that have considerably more specific capacitance than conventional capacitors.

Supercapacitors are pretty widely used in areas such as consumer electronics, automotive, and aerospace. The global supercapacitor market, which is 487.45 million USD wide in 2019, is expected to reach 1.570,75 billion USD in 2025. The choice of electrolytes has vital importance to obtain a good performance for supercapacitors. Concentrated acid such as $H_2SO_4$ or concentrated base such as KOH can be used alone or inside a hydrogel. Porous and conductive structure is necessary for high ion diffusivity. Phosphoric acid ($H_3PO_4 \cdot H_2O$, PA) provides high proton conductivity and high specific capacitance, with the combination of reduced graphene oxide symmetric electrode, compared to commonly used electrolytes such as $H_2SO_4$ and KOH. In meanwhile there is no application with concentrated PA (higher than 3 M) as an electrolyte. Furthermore, it needs to be confined in a matrix to sustain a high ion conductivity in a supercapacitor. PA can form highly ordered mesostructured liquid crystal gels (LC) at a certain mole ratio with non-ionic surfactants lauryl ether (LE) ($C_{58}H_{118}O_{24}$) and the LCs have a potential to be used as an electrolyte.

Ömer Dağ et al. showed that PA and nonionic surfactant (LE, $C_{12}H_{25}(OCH_2CH_2)_{10}OH$, $C_{12}E_{10}$) molecules self-assemble into PANS_LLCMs and display high proton conductivity. The content of the PANS_LLCM can be as high 75% $H_3PO_4 \cdot$ 3 $H_2O$ and 25% 10-lauryl ether (LE, $C_{12}H_{25}(OCH_2CH_2)_{10}OH$, $C_{12}E_{10}$), and the mesophase follows the usual LLC trend, bicontinuous cubic (V1)_normal hexagonal (H1)_micelle cubic (I1), by increasing the PA concentration in the media. However, this study has been carried out for its use only in optical modulator applications. Optical modulators are systems used to modulate the beam of light. Although they are similar in structure to supercapacitors, they are not used for energy storage. In that study, the molar ratio of phosphoric acid (PA) to lauryl ether (LE), in which the liquid crystal phase is formed, is between 1-20, and the mole ratio is not exceeded 20. Therefore, gels are not suitable for use in supercapacitors (energy storage systems) because of their viscosities and ionic conductivities obtained at these mole ratios.

SUMMARY

In the present invention, thermally reduced graphene oxide is used as electrode, and gel electrolytes are prepared by using PA and non-ionic surfactants lauryl ether (LE) in different molar ratios. Electrochemical performances of the supercapacitor cell were evaluated on the basis of capacitive properties. In this manner, cyclic voltammetry, electrochemical impedance spectroscopy and galvanostatic charge and discharge tests were carried out.

The present invention aims to overcome common problems of conventional supercapacitors with the liquid electrolyte such as unoptimized interface resistance, high corrosion rate, easy degradation of electrodes, manufacturing difficulties, low potential range and self-discharge and with the organic electrolytes such as low thermal stability and high volatility.

This invention describes a supercapacitor with advantages of a more controlled ion diffusivity with optimized interface resistance, high ionic conductivity, low Corrosion Rate (Electrode Protection), low operating viscosity, low volatility, high thermal stability and easy manufacturing. In addition, the chemicals used in this invention belong to class of green chemistry.

DETAILED DESCRIPTION OF THE EMBODIMENTS

Figure 1:
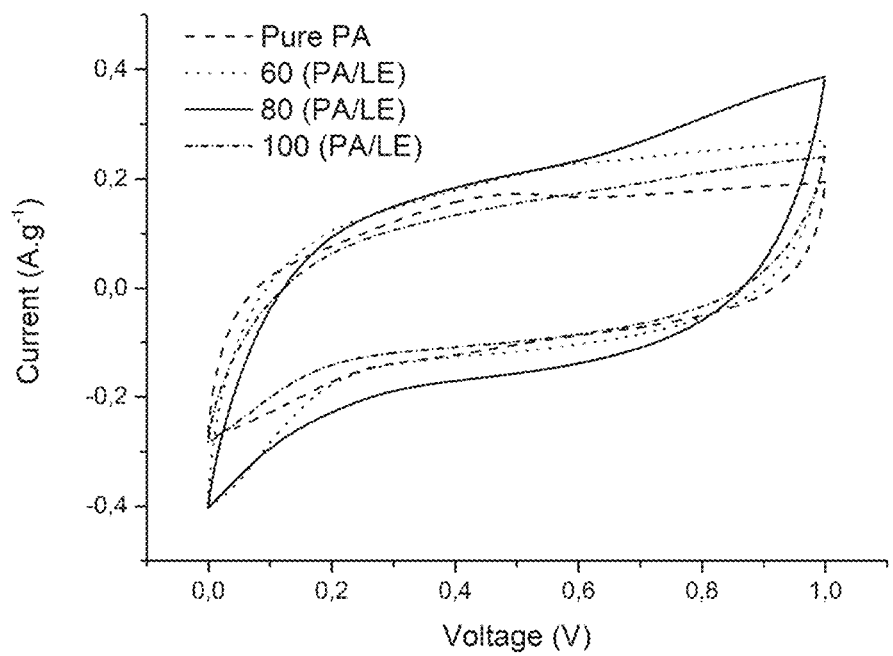
FIG. 1 shows cyclic voltamograms of 60, 80, 100 and pure phosphoric acid electrolytes.

The present invention relates to a gel electrolyte for use in an energy storage device comprising liquid crystal produced from acidic solution and surfactant. Preferably, surfactant is a nonionic surfactant, more preferably nonionic lauryl ether surfactant.

Electrolyte comprises phosphoric acid and nonionic surfactant, wherein the molar ratio of phosphoric acid to nonionic surfactant is 50 to 120. The supercapacitor works at the best performance within this range of molar ratio because of the ideal viscosity and the ionic conductivity. The LE used particularly in this invention is a lauryl ether, $C_{12}E_{10}$. However, any nonionic surfactant can function as the template of mesostructured LC gel. The molar ratio of PA to nonionic surfactant needs to be optimized depending on the type of the nonionic surfactant.

The LC gel electrolyte offers more controlled ion diffusivity with optimized interface resistance, high ionic conductivity, low corrosion rate (Electrode Protection), low operating viscosity, low volatility, high thermal stability and easy manufacturing.

Electrolyte type plays an important role in the performance of energy storage systems. Phosphoric acid ($H_3PO_4 \cdot H_2O$, PA) can provide high specific capacitance compared to commonly used electrolytes such as $H_2SO_4$ and KOH. However, it needs to be confined in a matrix to supplement high ion conductivity through hydrogen bonding, which provides hydrogen hopping, in an energy storage system. Phosphoric acid can form highly ordered mesostructured liquid crystal gels (LC) with non-ionic surfactant lauryl ether (LE) and the LCs have been shown to be promising to be used as an electrolyte.

In this invention gel electrolytes were prepared by using phosphoric acid (PA) and nonionic surfactant lauryl ether (LE) at different molar ratios. PA and LE are used to form liquid crystal gels at different molar ratios and proved to offer high specific capacity, Cg, at around 1200 F/g under the test conditions of 0.1 A/g with the combination of high surface area symmetric electrodes. In particular, first of all, the LE is brought to its melting point in an oven and then, it is mixed with the PA at a desired amount. Then, the mixture is let to be homogenized at 80° C. for 15 minutes.

Liquid crystals are a state of matter which has properties between those of conventional liquids and those of solid crystals. For instance, a liquid crystal may flow like a liquid, but its molecules may be oriented in a crystal-like way. The LC gel electrolyte offers more controlled ion diffusivity with optimized interface resistance, high ionic conductivity, low corrosion rate (Electrode Protection), low operating viscosity, low volatility, high thermal stability, and easy manufacturing.

The supercapacitor of this invention is prepared through confining the LC gel electrolyte between two electrodes. A separator membrane made of cellulose is also inserted between the electrodes with the LC gel electrolyte. The electrodes do not necessarily have to be symmetric. It can also be made of asymmetric supercapacitor.

Figure 2:
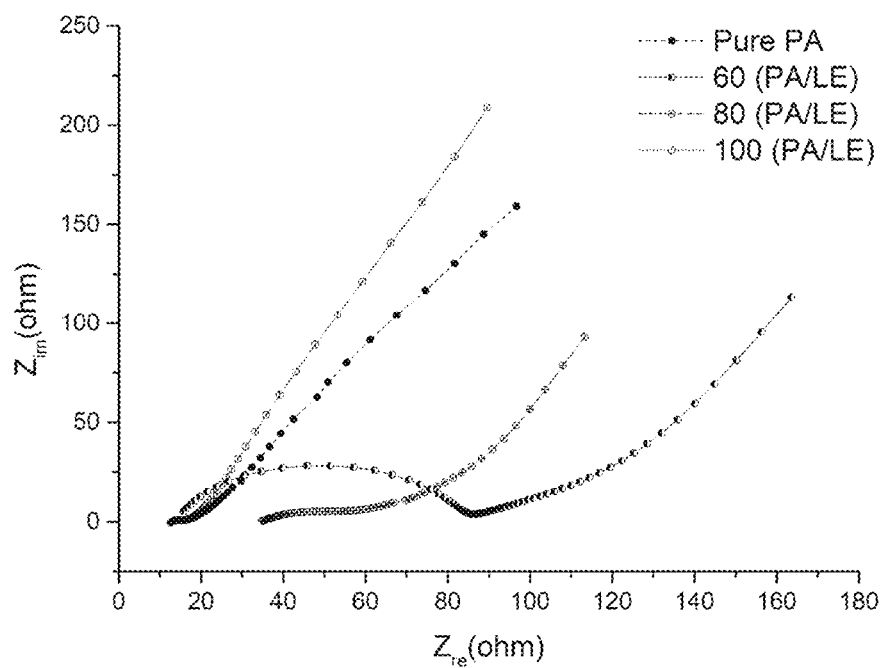
FIG. 2 shows electrochemical impedance spectra of 60, 80, 100 and pure phosphoric acid electrolytes.

In this invention, the molar ratio of phosphoric acid and nonionic surfactant in the liquid crystal is optimized. Appropriate amount was determined and successfully used in energy storage system. Various gel electrolytes were prepared by mixing appropriate amount of phosphoric acid and nonionic surfactant. In this context, 60, 80, 100 mole ratio phosphoric acid to nonionic surfactant were studied. The viscosity of the solution in this mole ratio range allowed us to prepare high performance supercapacitor. At mole ratios below 60, the viscosity of the gel was too high to be processed as a supercapacitor electrolyte. In addition, charge transfer resistance of the supercapacitor was too high and these test cells could not be operated as supercapacitor. The supercapacitor works at the best performance within 50-120 range of molar ratio because of the ideal viscosity and the ionic conductivity. The LE used particularly in this invention is a lauryl ether, C12E10. However, any nonionic surfactant can function as the template of the LC gel mesostructured. The molar ratio of PA to LE needs to be optimized depending on the type of the LE For the first time in the literature cyclic voltammetry, electrochemical impedance spectroscopy and galvanostatic charge and discharge tests were conducted for this novel gel electrolyte. As seen in cyclic voltammograms (FIG. 1) highest specific capacitance was obtained with the mole ratio of 80. As seen in electrochemical impedance spectrum (FIG. 2) of supercapacitor cells, the highest charge transfer resistance was obtained in 60 mole ratio. And the lowest charge transfer resistance was obtained in pure phosphoric acid. Optimized charge transfer resistance is needed to provide better control of ions mobility towards electrodes.

Figure 3:
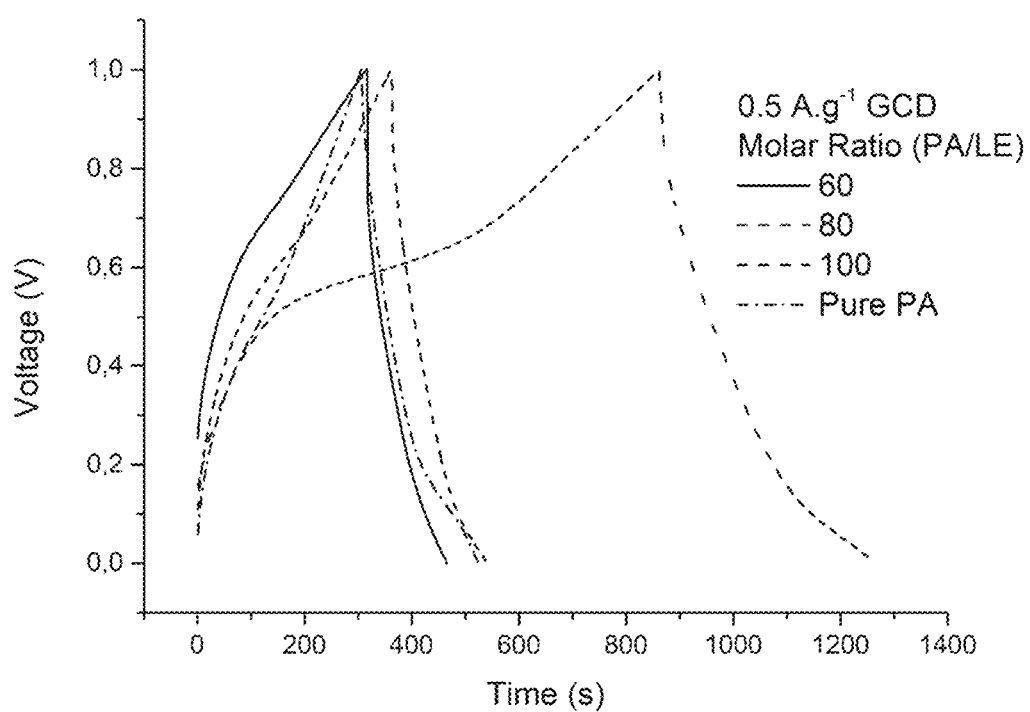
FIG. 3 shows galvanostatic charge and discharge curves of 60, 80, 100 and pure phosphoric acid electrolytes.

As indicated in FIG. 3 highest specific discharge capacitance was obtained in 80 mole ratio around 1000-1300 $F \cdot g^{-1}$. Such a high value of specific capacitance is not common in this class of materials.

What is claimed is:

1. A gel electrolyte for use in an energy storage device, comprising liquid crystal produced from phosphoric acid and nonionic surfactant, wherein a molar ratio of the phosphoric acid to the nonionic surfactant is 50 to 120.

2. The gel electrolyte of claim 1, wherein the molar ratio of the phosphoric acid to the nonionic surfactant is above 60.

3. The gel electrolyte of claim 1, wherein the nonionic surfactant is a lauryl ether.

4. The gel electrolyte of claim 3, wherein a molar ratio of the phosphoric acid to the lauryl ether is 80.

5. A supercapacitor cell, comprising the gel electrolyte according to claim 1.

6. The supercapacitor cell of claim 5, wherein in the gel electrolyte, the molar ratio of the phosphoric acid to the nonionic surfactant is above 60.

7. The supercapacitor cell of claim 5, wherein in the gel electrolyte, the nonionic surfactant is a lauryl ether.

8. The supercapacitor cell of claim 7, wherein in the gel electrolyte, a molar ratio of the phosphoric acid to the lauryl ether is 80.

* * * * *